United States Patent
Grajcar (10) Patent No.: US 9,700,019 B2
(45) Date of Patent: Jul. 11, 2017

(54) LED LIGHTING FOR LIVESTOCK DEVELOPMENT

(75) Inventor: Zdenko Grajcar, Crystal, MN (US)

(73) Assignee: ONCE INNOVATIONS, INC., Plymoth, MN (US)

(*) Notice: Subject to any disclaimer, the term of this patent is extended or adjusted under 35 U.S.C. 154(b) by 591 days.

(21) Appl. No.: 12/916,313

(22) Filed: Oct. 29, 2010

(65) Prior Publication Data

US 2011/0101883 A1    May 5, 2011

Related U.S. Application Data

(60) Provisional application No. 61/255,855, filed on Oct. 29, 2009.

(51) Int. Cl.
| | |
|---|---|
| *H05B 33/08* | (2006.01) |
| *A01K 29/00* | (2006.01) |
| *F21S 8/06* | (2006.01) |
| *F21V 29/77* | (2015.01) |
| *A01K 1/00* | (2006.01) |

(Continued)

(52) U.S. Cl.
CPC .......... *A01K 29/00* (2013.01); *F21S 8/06* (2013.01); *F21V 29/773* (2015.01); *H05B 33/083* (2013.01); *H05B 33/0821* (2013.01); *H05B 33/0857* (2013.01); *A01K 1/0088* (2013.01); *A01K 2227/108* (2013.01); *F21V 29/004* (2013.01); *F21Y 2115/10* (2016.08); *H05B 33/0809* (2013.01); *H05B 33/0833* (2013.01)

(58) Field of Classification Search
CPC ............ A01K 1/0088; A01K 2227/108; H05B 33/0809; H05B 33/0833

USPC ............... 315/291, 297, 302, 307, 308, 363; 362/126, 227, 230, 231, 257, 404, 407, 362/408, 433, 437, 438, 800; 119/174, 119/502, 503, 508, 518

See application file for complete search history.

(56) References Cited

U.S. PATENT DOCUMENTS 4,239,020 A    12/1980  Kiyokawa et al.
RE33,600 E *  6/1991  Timmons ............. A01K 1/0047
                                                             119/306

(Continued)

OTHER PUBLICATIONS

Rahimi et al., "The Effect of Intermittent Lighting Schedule on Broiler Performance", 2005.*

(Continued)

*Primary Examiner* — Douglas W Owens
*Assistant Examiner* — Borna Alaeddini
(74) *Attorney, Agent, or Firm* — McDermott Will & Emery LLP (57) ABSTRACT

Apparatus and associated methods involve a hangable LED light assembly constructed to provide a selected color output illumination as a function of excitation intensity. In an illustrative example, the color output may be selected to promote biological development throughout livestock development stages (e.g., incubation, growth, and reproduction). The light intensity may controllable, for example, in response to a light dimmer arranged to modulate AC excitation applied to the LED downlight. As the light intensity is decreased in response to a simple dimmer control, the spectral output of the LED downlight may shift its output wavelengths. Accordingly, some exemplary installations may provide controlled combinations of intensity and color to substantially optimize lighting conditions for livestock.

6 Claims, 6 Drawing Sheets

(51) Int. Cl.
  *F21V 29/00* (2015.01)
  *F21Y 115/10* (2016.01)

(56) References Cited

U.S. PATENT DOCUMENTS

| | | | |
|---|---|---|---|
| 5,482,210 A * | 1/1996 | Carey | A01K 1/0047 236/44 C |
| 6,116,190 A * | 9/2000 | Kitt | 119/503 |
| 6,224,243 B1 * | 5/2001 | Karton | 362/408 |
| 6,236,622 B1 * | 5/2001 | Blackman | 368/10 |
| 6,766,767 B2 * | 7/2004 | El Halawani | A01K 45/00 119/174 |
| 6,789,500 B2 | 9/2004 | Rozenboim | |
| 7,131,397 B2 | 11/2006 | El Halawani et al. | |
| 7,220,018 B2 * | 5/2007 | Crabb | A01G 7/045 362/231 |
| 7,436,134 B2 * | 10/2008 | Levine | A01K 63/06 315/360 |
| 7,723,926 B2 * | 5/2010 | Mednik et al. | 315/291 |
| D621,973 S | 8/2010 | Grajcar | |
| D621,974 S | 8/2010 | Grajcar | |
| 8,324,642 B2 | 12/2012 | Grajcar | |
| 8,373,363 B2 | 2/2013 | Grajcar | |
| 2005/0241593 A1 * | 11/2005 | Kaura | A01K 1/0088 119/496 |
| 2005/0256554 A1 | 11/2005 | Malak | |
| 2005/0276720 A1 * | 12/2005 | Correa | A01K 43/005 422/24 |
| 2007/0086912 A1 | 4/2007 | Dowling et al. | |
| 2007/0182338 A1 * | 8/2007 | Shteynberg et al. | 315/200 R |
| 2008/0012722 A1 | 1/2008 | Moseley | |
| 2008/0174233 A1 | 7/2008 | Bawendi et al. | |
| 2008/0218995 A1 * | 9/2008 | Gilkey | A01K 63/06 362/101 |
| 2009/0185373 A1 | 7/2009 | Grajcar | |
| 2010/0294205 A1 | 11/2010 | Kakimi et al. | |
| 2011/0031888 A1 * | 2/2011 | Datta et al. | 315/122 |
| 2011/0101883 A1 | 5/2011 | Grajcar | |
| 2011/0109244 A1 | 5/2011 | Grajcar | |
| 2011/0210678 A1 | 9/2011 | Grajcar | |
| 2011/0228515 A1 | 9/2011 | Grajcar | |
| 2012/0002408 A1 | 1/2012 | Lichten et al. | |

OTHER PUBLICATIONS

YouTube.com, "Philips versus the Sun", uploaded on Jun. 23, 2009.*
Koninklijke Philips Electronics N.V., "HF346301 Wake Up Alarm", Aug. 30, 2008.*
International Preliminary Report on Patentability issued in PCT/US2010/054869, mailed on May 10, 2012.
International Search Report issued in PCT/US10/54869 mailed on Jan. 12, 2011.
"Dali leading and trailing—edge phase dimmers"PCD 300, Lux Control spec., Dec. 11, 2006 retrieved Dec. 20, 2010 from url: http://www.tridonic.com/com/en/downloads/DS_DALI-PCD_300_one4all)en.pdf.
H. J.A. Dartnall, J.K. Bowmaker, J.D. Mollon, Human Visual Pigments: Microspectrophotometric Results from the Eyes of Seven Persons., Proceedings of the Royal Society of London. Series B, Biological Sciences, vol. 220, Issue 1218, Nov. 22, 1983, pp. 115-130.
Halevy, O., Rozenboim, I., Yahav, S., Piestun, I. (2006) Muscle Development: Could Environmental Manipulations during Embryo Genesis of Broilers Change it?. World Poult. Sci. J., XII European Poultry Conference. Sep. 10-14, 2006, 62, Supplement, 251, (2006).
Isreal Rozenboim, Issak Biran, Zehava Uni, Boaz Robinzon, Orna Halevy, "The Effect of Monochromatic Light on Broiler Growth and Development." Poultry Science 78, No. 1 (1999): 135-138.
G. Rahimi, M. Rezaei, H. Hafezian, H. Saiyahzadeh, "The Effect of Intermittent Lighting Schedule on Broiler Performance", International Journal of Poultry Science 4 (6): 396-398, 2005 ISSN 1682-8356.
I. Rozenboim, I. Biran, Chaiseha, S. Yahav, A. Rosenstrauch, D. Sklan, O Halevy. "The Effect of a Green and Blue Monochromatic Light Combination on Broiler Growth and Development." Poultry Science 83, No. 5 (2004): 842-845.
Davis, N. J., N. B. Prescott, C. J. Savory, and C. M. Wathes. "Preferences of Growing Fowls for Different Light Intensities in Relation to Age, Strain and Behavior." Animal Welfare 8, No. 3 (1999): 193-203.
International Preliminary Report on Patentability Issued in PCT/US2011/028910, mailed on Sep. 18, 2012.
Kennedy et al., "Selective Light Absorption by the Lenses of Lower Vertebrates and its Influence on Spectral Sensitivity." The Biological Bulletin (1956) 111:375-376.
International Search Report in PCT/US2011/028910, mailed on May 26, 2011.
Taylor, Nina, "Lighting for Pig Units." Report compiled for BPEX, Submitted Apr. 30, 2010.
Manci, William E., Richardson, Kenneth G., Bauer, Jeffrey F., "Design and Performance of an Electronic Lighting-Control Circuit That Simulates Sunrise and Sunset." The Progressive Fish-Culturist 54: 137-129, 1992.
Neitz, Jay, Jacobs, Gerald H., "Spectral Sensitivity of Cones in an Ungulate." Visual Neuroscience (1989), 2, 97-100.
Bowmaker, James K., Hunt, David M., "Evolution of Vertebrate Visual Pigments." Current Biology 2, No. 13 (2006): 484-489.
Jacobs, Gerald H., "Evolution of Colour Vision in Mammals." Phil. Trans. R. Soc. B (2009) 2957-2967.
Carroll, Joseph, Murphy, Christopher J., Neitz, Maureen, Ver Hoeve, James N., Neitz, Jay, "Photopigment Basis for Dichromatic Color Vision in the Horse." Journal of Vision (2001) 1, 80-87.
Clarke, S., Eng, P., Chambers, R., Eng, P. "Energy Efficient Swine Lighting." Ontario Ministry of Agriculture, Food and Rural Affairs Fact Sheet (2006).
Bruininx, E.M.A.M, Heetkamp, M.J., Van Den Bogaart D., Van Der Peet-Schwering C.M., Beynen A. C., Everts H., Den Hartog L.A., Schrama J.W., "A prolonged photoperiod improves feed intake and energy metabolism of weanling pigs." J Anim Sci. Jul. 2002; 80(7):1736-45.
Jacobs, Gerald H., Deegan, Jess F. II, Neitz, Jay, "Photopigment Basis for Dichromatic Color Vision in Cows, Goats, and Sheep." Visual Neuroscience (1998) 15: 581-584.
Chiao, Chuan-Chin, Vorobyev, Misha, Cronin, Thomas W., Osorio, Daniel, "Spectral Tuning of Dichromats to Natural Scenes." Vision Research 40 (2000) 3257-3271.
Extended European Search Report issued Feb. 5, 2016, in related European Patent Application No. 10827580.1.
Communication Pursuant to Article 94(3) EPC dated Apr. 13, 2017, issued in European Patent Application No. 10 827 580.1.

* cited by examiner

LED LIGHTING FOR LIVESTOCK DEVELOPMENT

CROSS-REFERENCE TO RELATED APPLICATIONS

This application claims priority to and the benefit of U.S. Provisional Patent Application entitled "LED Lighting for Livestock Development," Ser. No. 61/255,855, which was filed by Z. Grajcar on Oct. 29, 2010, the entire contents of which are incorporated herein by reference.

TECHNICAL FIELD

Various embodiments relate generally to methods and apparatus for dynamic LED (light emitting diode) illumination to promote biological development of livestock.

BACKGROUND

Lighting can be an important consideration in some applications, such as livestock production. As an example, so-called "long day" lighting practices have been proposed to promote increased daily milk production from cows. Some research also suggests, for example, that poultry development behaviors can be influenced by lighting intensity, color, or time schedule. For example, infrared lighting may promote aggression in chickens, while too much darkness might lead to fearfulness.

In general, "poultry" can refer to domesticated fowl raised for meat or eggs. Typical examples of poultry can include chickens, turkeys, ducks, geese, emus, ostriches or game birds. In some cases, poultry are raised in a poultry house. An example poultry house could be 40 feet wide and 600 feet long, with a ceiling that is eleven feet high. For so-called "broilers," young chickens raised for their meat, one research study found that a schedule of intermittent lighting resulted in decreased fat deposition and improved feed conversion efficiency relative to a continuous lighting environment. (See Rahmi, G., et al., "The Effect of Intermittent Lighting Schedule on Broiler Performance," Int'l. J. Poultry Sci. 4 (6): 396-398 (2005), the entire contents of which are incorporated herein by reference).

Various types of lighting have been employed in livestock production facilities. Livestock lighting systems that have been used include incandescent, fluorescent, and more recently, LEDs (light emitting diodes).

LEDs are becoming widely used devices capable of illumination when supplied with current. Typically, an LED is formed as a semiconductor diode having an anode and a cathode. In theory, an ideal diode will only conduct current in one direction. When sufficient forward bias voltage is applied between the anode and cathode, conventional current flows through the diode. Forward current flow through an LED may cause photons to recombine with holes to release energy in the form of light.

The emitted light from some LEDs is in the visible wavelength spectrum. By proper selection of semiconductor materials, individual LEDs can be constructed to emit certain colors (e.g., wavelength), such as red, blue, or green, for example.

In general, an LED may be created on a conventional semiconductor die. An individual LED may be integrated with other circuitry on the same die, or packaged as a discrete single component. Typically, the package that contains the LED semiconductor element will include a transparent window to permit the light to escape from the package.

SUMMARY

Apparatus and associated methods involve a hangable LED light assembly constructed to provide a selected color output illumination as a function of excitation intensity. In an illustrative example, the color output may be selected to promote biological development throughout livestock development stages (e.g., incubation, growth, and reproduction). The light intensity may controllable, for example, in response to a light dimmer arranged to modulate AC excitation applied to the LED downlight. As the light intensity is decreased in response to a simple dimmer control, the spectral output of the LED downlight may shift its output wavelengths. Accordingly, some exemplary installations may provide controlled combinations of intensity and color to substantially optimize lighting conditions for livestock.

In an illustrative example, a broiler chicken at an early stage of development (e.g., 5 days), may be exposed to relatively high intensity (e.g., about 40 lux) substantially white light from the LED downlight. As the chicken ages, the AC excitation supplied to the LED downlight may be progressively reduced, thereby progressively dimming the intensity of the light exposure. As the light intensity falls, the color output of the LED downlight may progressively shift. In one example, the LED downlight may smoothly shift color output from substantially white at high intensity to substantially blue or bluish-green at low intensity (e.g., about 5 lux).

Various embodiments may achieve one or more advantages. For example, in some embodiments a simple dimmer control may modulate a single analog value (e.g., phase angle, or amplitude) to provide a substantially optimized intensity-wavelength illumination to promote biological development of livestock. For example, wavelengths for some embodiments may be selected, for example, to substantially avoid infrared light so as not to stimulate aggressive (e.g., fighting) behaviors. Moreover, various embodiments may introduce substantially reduced levels of stress in livestock, for example, by operating without audible vibrations (e.g., humming). Moreover, various embodiments may illuminate at twice the AC line frequency to substantially reduce the amount of flickering perceptible to livestock.

Some embodiments may provide a desired intensity and one or more corresponding color shift characteristics. Some embodiments may substantially reduce cost, size, component count, weight, reliability, and efficiency of a dimmable LED light source. In some embodiments, the selective current diversion circuitry may operate with reduced harmonic distortion and/or power factor on the AC input current waveform using, for example, very simple, low cost, and low power circuitry. Accordingly, some embodiments may reduce energy requirements for illumination, provide desired illumination intensity and color over a biological cycle using a simple dimmer control, and avoid illumination with undesired wavelengths. Some embodiments may advantageously be enclosed in a water-resistant housing to permit cleaning using pressurized cold water sprays. In several embodiments, the housing may be ruggedized, require low cost for materials and assembly, and/or provide substantial heat sinking to the LED light engine during operation. Various examples may include a lens to supply a substantially uniform, downward-directed illumination pattern. Some embodiments may provide simple and low cost installation configurations that may include simple connection to a drop cord.

Various embodiments of the LED downlight may advantageously provide long-lasting illumination, be water-cleanable, and without potentially hazardous materials. Some embodiments may advantageously be provided as a kit that includes an LED downlight assembly in a container. The container may be advantageously arranged to be re-used for transporting replaced lamps (e.g., compact fluorescent lamps) that may spill hazardous materials (e.g., mercury) if not handled properly.

In some embodiments, the additional circuitry to achieve substantially reduced harmonic distortion may include a single transistor, or may further include a second transistor and a current sense element. In some examples, a current sensor may include a resistive element through which a portion of an LED current flows. In some embodiments, significant size and manufacturing cost reductions may be achieved by integrating the harmonic improvement circuitry on a die with one or more LEDs controlled by harmonic improvement circuitry. In certain examples, harmonic improvement circuitry may be integrated with corresponding controlled LEDs on a common die without increasing the number of process steps required to manufacture the LEDs alone. In various embodiments, harmonic distortion of AC input current may be substantially improved for AC-driven LED loads, for example, using either half-wave or full-wave rectification.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 5A:
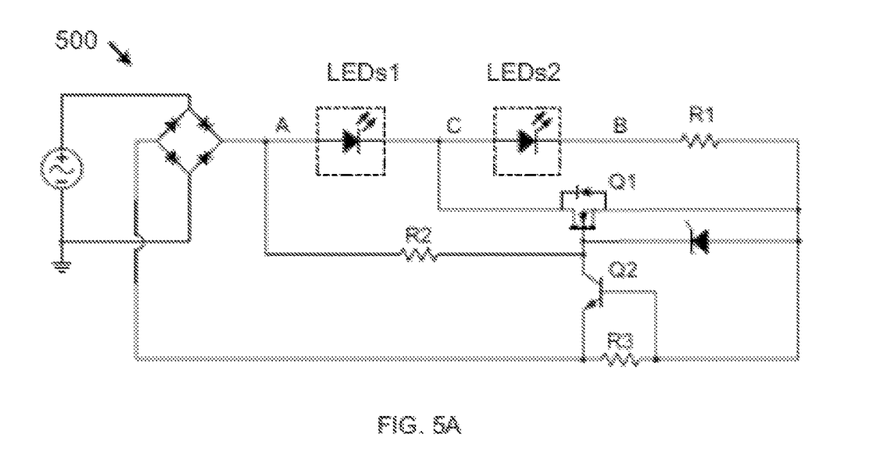
FIG. 5A shows a schematic of an exemplary circuit for an LED light engine with selective current diversion to bypass a group of LEDs while AC input excitation is below a predetermined level.
Figure 5B:
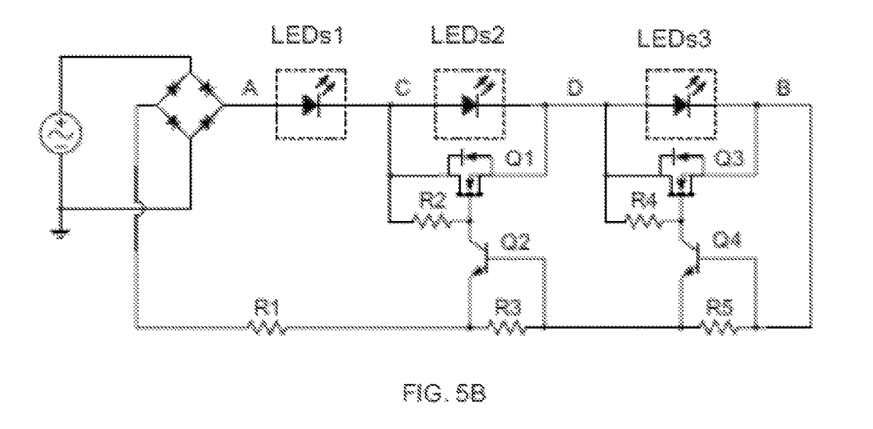
FIG. 5B depicts a schematic of an exemplary circuit for an LED light engine with selective current diversion to bypass two groups of LEDs while AC input excitation is below two corresponding predetermined levels.
Figure 6A:
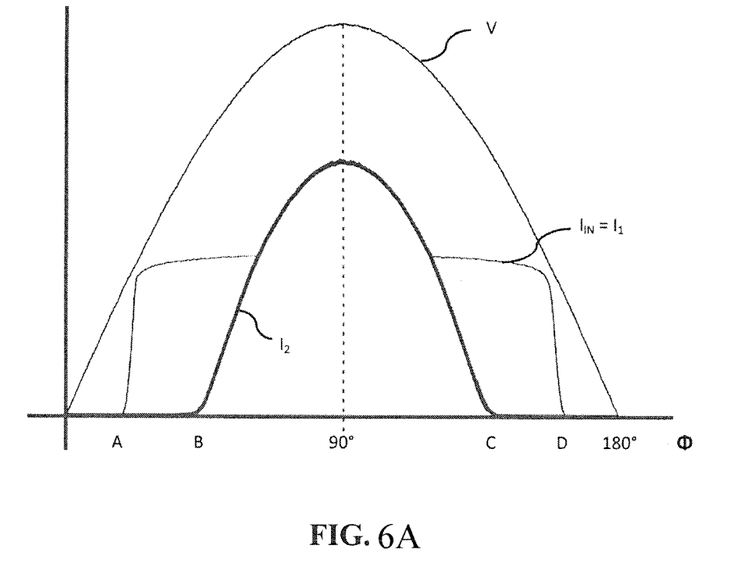
FIGS. 6A-6C depict exemplary electrical and light performance parameters for the light engine circuit of FIG. 5A.
Figure 6B:
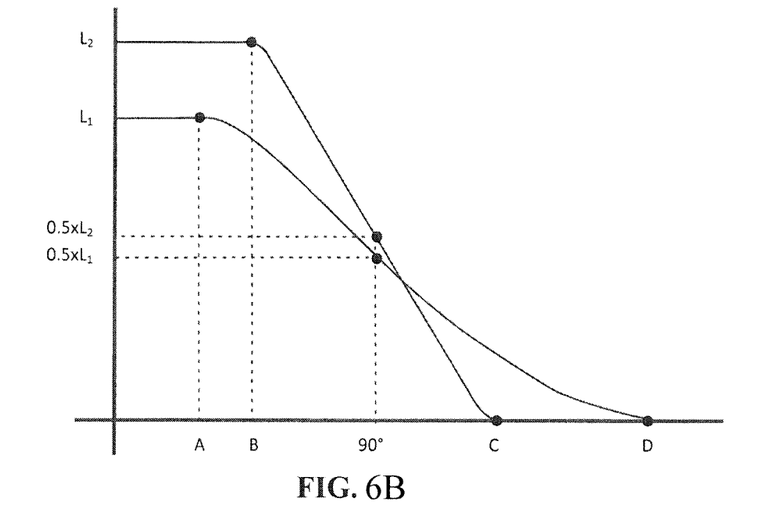
Figure 6C:
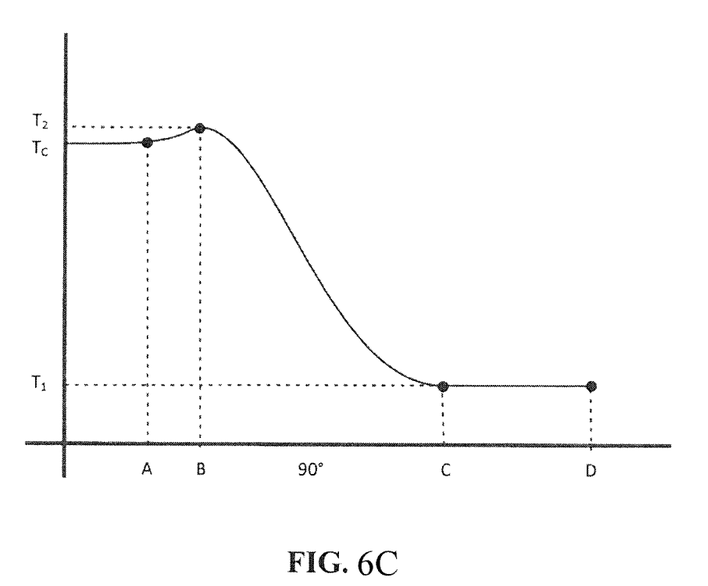

To aid understanding, this document is generally organized as follows. First, to help introduce discussion of various embodiments, an example agricultural environment for an AC LED lighting system is described with reference to FIG. 1. Then, exemplary assemblies, including an enclosure that serves as a heat sink, an optical lens, and an electrical interface to resist water penetration, are described with reference to FIGS. 2-4. With reference to FIGS. 5-6, this document describes examples of light engine circuits for providing dynamic color temperature responsive to controlled AC input excitation (e.g., phase control).

Figure 1:
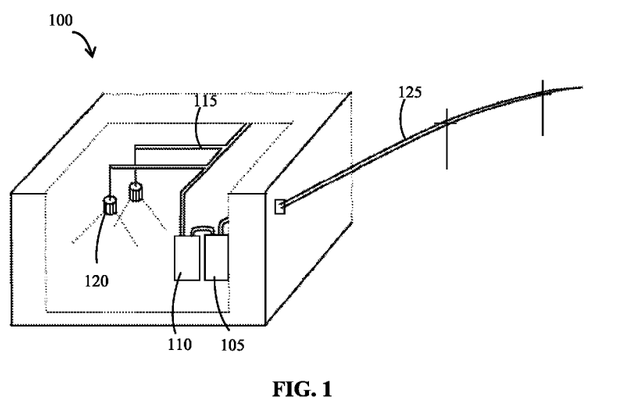
FIG. 1 shows an exemplary lighting installation in an agricultural facility.

FIG. 1 shows an exemplary lighting installation in an agricultural facility. In some implementations, the facility may be used to grow livestock such as poultry, swine, cows, horses, goats, or the like. By way of example and not limitation, the lighting may be used to promote the development of chickens such as breeders, broilers, or layers, for example. In various embodiments, the lighting may be sourced by one or more LED lamps, each of which may output a color temperature that is a function of the AC excitation level supplied from the controller. For different types of livestock, the color shift may be different to optimize the light exposure for each type. For example, breeders may require some periods of infrared light to promote sexual activity. Optimal spectral profiles may be developed based on published research results or empirical data, and appropriate spectral profiles may be provided by appropriate selection of type, number and color of groups of LEDs, LED light engine architecture with bypass circuitry, and dimming control profile.

In the example depicted in FIG. 1, a facility 100 includes a circuit breaker panel 105, a controller 110, an electrical distribution system 115, and a number of LED lamp assemblies 120. A pair of conductors 125 provide single phase AC power (e.g., 120-240 VAC, at 50-60 Hz) to the facility from a utility transmission system. Upon entering the facility 100, the AC power is routed through the breaker panel 105 to the controller 110. The controller 110 may be operated (e.g., under control of a programmed processor, or manual input) to provide a controlled reduction of the AC excitation for transmission to the LED lamp assemblies via the electrical distribution system 115. The LED lamp assemblies 120 are located within the facility 100 to artificially illuminate the livestock residing in a livestock area.

The depicted LED lamp assemblies 120 are hanging from electrical cords from an elevated portion of the facility's electrical distribution system 115. In some implementations, the LED lamp assemblies 120 may be mounted as fixtures to infrastructure or supports within the facility 100. The LED lamp assemblies 120 may be located at one or more elevations within the facility, for example, to provide a high bay and/or low bay lighting.

The controller 110 may controllably attenuate the AC excitation voltage and/or current supplied to the LED lamp assemblies 120. By way of example and not limitation, the controller 110 may function as a phase controlled dimmer with leading edge and/or trailing edge phase cutting, pulse width modulation, or amplitude modulation, for example. Exemplary approaches for modulating the AC excitation are described in further detail, for example, at least with reference to FIG. 1 of U.S. Provisional Patent Application entitled "Architecture for High Power Factor and Low Harmonic Distortion LED Lighting," Ser. No. 61/255,491, which was filed by Z. Grajcar on Oct. 28, 2009, the entire contents of which are incorporated herein by reference. The control may be manual or automatically controlled, for example, to provide a desired timing and duration of light and dark cycles (with corresponding color shift provided by operation of examples of the LED light circuit engine).

In various examples, the controller 110 may include a phase control module to control what portion of the AC excitation waveform is substantially blocked from supply to a light engine, where less blockage may correspond to increased excitation level. In other embodiments, the AC excitation may be modulated using one or more other techniques, either alone or in combination. For example, pulse-width modulation, alone or in combination with phase control, may be used to module the AC excitation at modulation frequency that is substantially higher than the fundamental AC excitation frequency.

In some examples, modulation of the AC excitation signal may involve a de-energized mode in which substantially no excitation is applied to the light engine. Accordingly, some implementations may include a disconnect switch (e.g., solid state or mechanical relay) in combination with the excitation modulation control (e.g., phase control module 130). The disconnect switch may be arranged in series to interrupt the supply connection of AC excitation to the light engine. A disconnect switch may be included on the circuit breaker panel 105 that receives AC input from an electrical utility source and distributes the AC excitation to the lamp assemblies 120. In some examples, the disconnect switch may be arranged at a different node in the circuit than the node in the circuit breaker panel 105. Some examples may include the disconnect switch arranged to respond to an automated input signal (e.g., from a programmable controller) and/or to the user input element being placed into a predetermined position (e.g., moved to an end of travel position, pushed in to engage a switch, or the like).

Figure 2:
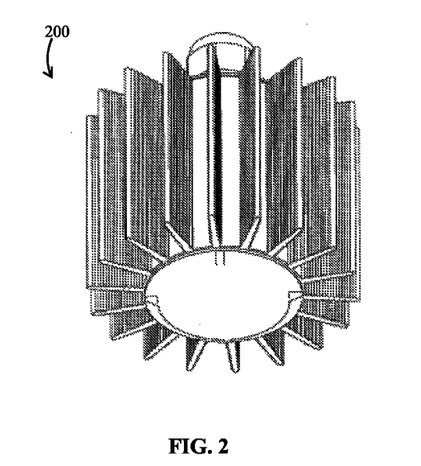
FIG. 2 shows an exemplary LED lamp assembly for illuminating the facility of FIG. 1.

FIG. 2 shows an exemplary LED lamp assembly 200 for illuminating the facility of FIG. 1. In the depicted embodiment, the LED lamp assembly 200 may serve as a hangable downlight. The LED lamp assembly 200 may be substantially sealed to resist the ingress of water, for example, when sprayed during a hose-down cleaning process within the facility.

In some embodiments, the lamp assembly 200 may be oriented to illuminate along an axis substantially directed upward with respect to a horizontal plane. For example, some implementations may orient the lamp assembly 200 to direct the illumination upward or at an upward angle, e.g., for sign or uplight illumination.

Figure 3:
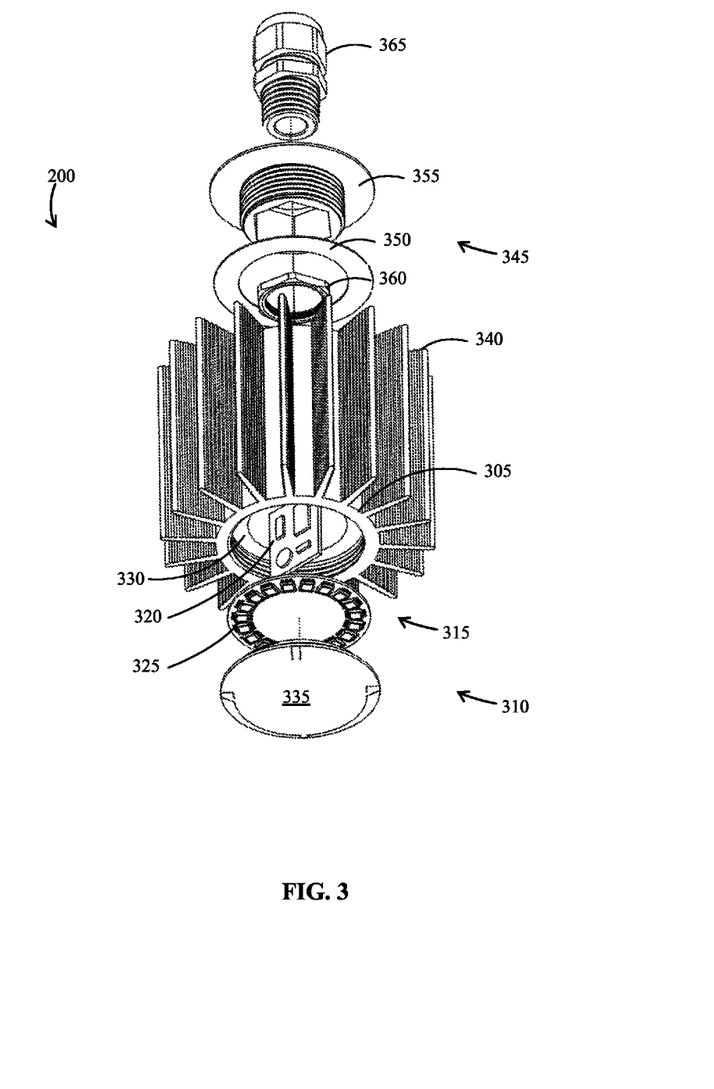
FIG. 3 shows an exploded view showing construction of the LED lamp assembly of FIG. 2.

FIG. 3 shows an exploded view showing construction of one embodiment of the LED lamp assembly 200 of FIG. 2. The depicted LED lamp assembly includes a housing body 305 and an electro-optical sub-assembly 310.

The electro-optical sub-assembly 310 includes an LED light engine circuit 315. Examples of schematics for an LED light engine circuit are described in further detail with reference to FIGS. 5A-6C or in documents that are incorporated herein by reference. In the depicted example, the pair of conductors (not shown) that supply AC excitation may be connected to a control module 320 formed on a PCB (printed circuit board) or flex circuit for assembly in a central cavity of the housing body. In some examples, the control module 320 includes a rectifier and one or more bypass circuits, examples of which are described with reference to FIGS. 5A-5B. In an illustrative example, an electrical interface may couple a unidirectional output voltage from the rectifier, and a bypass current path from the control module 320 to an LED module 325. The depicted LED module 325 includes a number of LEDs distributed on a circular PCB or flex circuit substrate.

The LEDs on the LED module 325 may include one or more types and colors of LEDs. In operation, some examples may operate the bypass circuit to substantially shift a color temperature of the LED light output as a function of the applied AC excitation. As an illustrative example, a dimmer may reduce the applied AC excitation by phase cutting a portion of the current waveform through the LED module 325. The bypass circuit may operate to automatically and smoothly shift color temperature of the LED lamp assembly from a cool white or bluish-white at high intensity to a dim blue or blue-green at low intensity.

In an illustrative example, AC excitation level may be reduced from a rated (e.g., 100% of nominal voltage, such as 120 V/60 Hz sinusoidal waveform in the United States) excitation level in a substantially smooth and continuous manner down to about 15%, 10%, 5%, or about 0% of rated excitation level. At some excitation level, an illumination output from illuminants in a bypass path may cease to conduct substantial current, and go dark, while other illuminants in a run path may produce substantial illumination. In some examples, a selected wavelength generated in response to current in the bypass path may not be present in a substantial level in response to current in the run path. Accordingly, the selected wavelength may be substantially removed by reducing the excitation level such that substantial current is conducted only in the run path.

The housing body 305 may provide a substantial heat capacity and readily receive conducted and/or radiated heat energy dissipated by the electrical and optical components in the housing. A low thermal resistance metal, for example, may function to distribute heat energy substantially throughout the housing body, and tend to make the temperature profile substantially uniform around an exterior surface of the housing body. At points of contact between the electro-optical sub-assembly 315 and the housing body 305, some embodiments may include a low thermal resistance substance (e.g., heat sink compound) or thermally conductive gasket material to promote conductive heat transfer to the housing body. In the depicted example, a shoulder 330 formed in the interior of the housing body provides an annular surface area that may support an LED light engine circuit substrate, which has a corresponding circular size and shape.

Thermal resistance may be controlled, in some examples, by screwing in a lens 335 sufficiently to compress the LED light engine circuit substrate against the shoulder 330 in the housing body. In some embodiments, a spring, coil, or compressible gasket may be provided as a compressible intermediate interface between the lens and the LED module 325, or between the LED module 325 and the shoulder 330 of the housing body 305.

The housing body further includes an open light output end and an open electrical interface end. The housing body includes a central cavity to receive the active electro-optic sub-assembly 315. The housing body 305 further includes radial exterior fins 340 with ridges that may transfer heat to the ambient environment. The central cavity extends from the open light output end to the open electrical interface end. In some embodiments, the housing body may be formed initially using an extrusion process. The housing body may be formed by extruding, stamping, or casting a metal, such as aluminum, nickel, steel, or a combination of two or more suitable metals.

In some examples, threads, slots, shoulders, or other features may be formed in the extruded work piece. Various embodiments of the completed housing may be manufactured using conventional and/or low cost techniques, such as lathing, milling, etching, drilling, or a combination of such techniques.

The opening at the light output end may be sealed by the lens 335. In this embodiment, the lens 335 and the opening at the light output end have corresponding threads to permit the lens 335 to be screwed in place. The lens 335 may be plastic, such as plastic that resists shattering when sprayed with cold water. In some applications, the lens 335 may be made of glass or a composite material, such as a lens with a film coating. The lens may be manufactured (e.g., sand blasted) to substantially diffuse the light from the individual LED sources.

The opening at the electrical interface end may be sealed by an electrical interface subassembly 345 and a gasket 350. The electrical interface subassembly 345 includes a threaded coupling 355 to screw into mating threads of the opening, and an interior hexagonal-shaped cavity to receive a threaded nut 360 for connection to an electric cord sealing coupler 365.

During assembly, a pair of conductors to supply AC excitation may be routed through the electric cord sealing coupler 365. The electric cord sealing coupler 365 may be installed by securing a threaded shaft in a central lumen of a threaded coupling 355. The electric cord sealing coupler 365 may be secured, for example, by a nut 360 in the interior hexagonal-shaped cavity and an opposing exterior nut on the threaded shaft. After making connection to the control module 320, the resulting sub-assembly 345 may be screwed into place over the gasket 350 to secure it to the housing body 305. Some embodiments may thus substantially seal the opening at the electrical interface end.

In some embodiments, both ends of the LED lamp assembly may be sufficiently water tight to substantially resist the ingress of matter, which may promote extended operational life for the LED lamp assembly. For example, the electrical interface may include a connector the meets the performance criteria for a protection rating under international standard IEC 60529. In various examples, the electrical interface may qualify for rating as an IP-61 (dripping water), IP-62 (dripping water while tilted at 15 degrees), IP-63 (spraying water), IP-64 (splashing water), IP-65 (water jets), IP-66 (powerful water jets), IP-67 (immersion up to 1 meter), or IP-68 (immersion beyond 1 meter).

In some examples, the interior cavity of the housing body may be at least partially filled with a potting compound. For example, after installation of the electro-optical assembly 310 into the body housing 305, potting material may be injected or poured to fill the cavity from the non-illuminating side of the LED module 325. The potting compound may be filled to substantially protect the electro-optic assembly 310, seal out contaminants, and or provide mechanical/vibration support for the LED module 325 and/or the control module 320. In some embodiments, the potting compound may further reduce thermal impedance between the electro-optic assembly 310 and the housing body 305. In some embodiments, the potting compound may be cured to form a resilient strain relief for the electrical interface.

Figure 4:
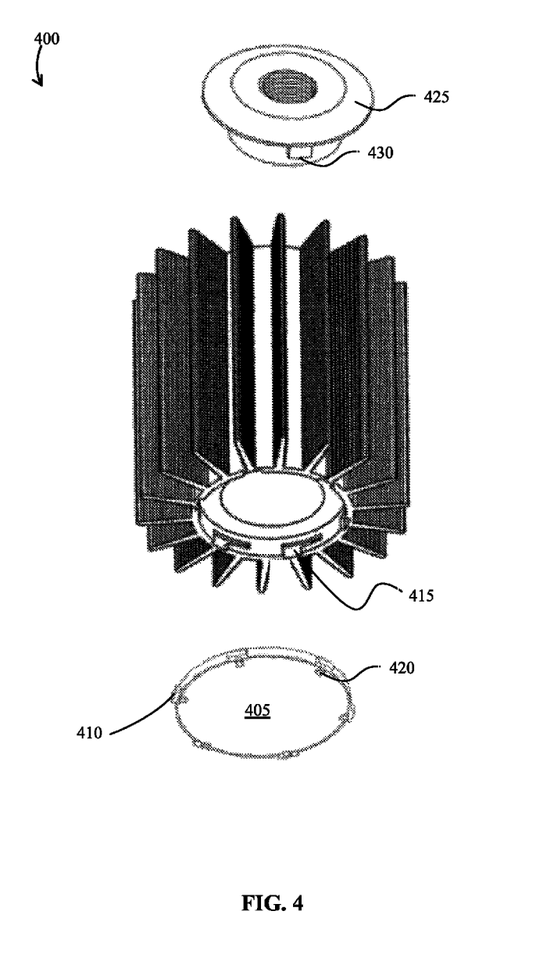
FIG. 4 shows another exemplary LED lamp assembly for illuminating the facility of FIG. 1.

FIG. 4 shows another exemplary LED lamp assembly for illuminating the facility of FIG. 1. In the depicted assembly 400, a lens 405 includes peripheral tabs 410 for locking in corresponding slots 415 formed in an interior wall of the housing body. In some examples, an annular compression spring (not shown) may be provided to provide a friction fit of the peripheral tabs in the slots.

To facilitate rotation of the lens during installation, tabs 420 are formed in an exterior top surface of the lens 405. A tool or fingers may apply a rotational force to the tabs 420 to rotate the lens 405 during installation or disassembly. Examples of a lens for an LED lamp assembly are described with reference, for example, at least to FIG. 5 of U.S. Design patent application entitled "LED Downlight Assembly," Ser. No. 29/345,833, which was filed by Z. Grajcar on Oct. 22, 2009, the entire contents of which are incorporated herein by reference.

The opening at the electrical interface end may be sealed by an electrical interface subassembly that includes a coupling 425 with locking tabs 430 to lock into mating slots formed of the opening (not shown). The coupling 430 further includes a threaded interior cavity to receive a threaded shaft of an electric cord sealing coupler.

FIG. 5A shows a schematic of an exemplary circuit for an LED light engine with selective current diversion to bypass a group of LEDs while AC input excitation is below a predetermined level. Various embodiments may advantageously yield improved power factor and/or a reduced harmonic distortion for a given peak illumination output from the LEDs.

The light engine circuit of FIG. 5A includes a bridge rectifier and two groups of LEDs: LEDs1 and LEDs2 each contain multiple LEDs. In operation, each group of LEDs1, 2 may have an effective forward voltage that is a substantial fraction of the applied peak excitation voltage. Their combined forward voltage in combination with a current limiting element may control the forward current. The current limiting element may include, for example, a fixed resistor, current controlled semiconductor, temperature-sensitive resistors, or the like.

The light engine circuit further includes a bypass circuit that operates to reduce the effective forward turn-on voltage of the circuit. In various embodiments, the bypass circuit may contribute to expanding the conduction angle at low AC input excitation levels, which may tend to benefit power factor and/or harmonic factor, e.g., by constructing a more sinusoidally-shaped current waveform.

The bypass circuit includes a bypass transistor (e.g., MOSFET, IGBT, bipolar, or the like) with its channel connected in parallel with the LEDs2. The conductivity of the channel is modulated by a control terminal (e.g., gate of the MOSFET). In the depicted example, the gate is pulled up in voltage through a resistor to a positive output terminal of the rectifier, but can be pulled down to a voltage near a voltage of the source of the MOSFET by a collector of an NPN transistor. The NPN transistor may pull down the MOSFET gate voltage when a base-emitter of the NPN transistor is forward biased by sufficient LED current through a sense resistor.

The depicted example further includes an exemplary protection element to limit the gate-to-source voltage of the MOSFET. In this example, a zener diode (e.g., 14V breakdown voltage) may serve to limit the voltage applied to the gate to a safe level for the MOSFET.

FIG. 5B depicts a schematic of an exemplary circuit for an LED light engine with selective current diversion to bypass two groups of LEDs while AC input excitation is below two corresponding predetermined levels. The light engine circuit of FIG. 5B adds an additional group of LEDs and a corresponding additional bypass circuit to the light engine circuit of FIG. 5A. Various embodiments may advantageously provide for two or more bypass circuits, for example, to permit additional degrees of freedom in constructing a more sinusoidally-shaped current waveform. Additional degrees of freedom may yield further potential improvements to power factor and further reduced harmonic distortion for a given peak illumination output from the LEDs.

FIGS. 6A-6C depict exemplary electrical and light performance parameters for the light engine circuit of FIG. 5A.

FIG. 6A depicts illustrative voltage and current waveforms for the light engine circuit of FIG. 5A. The graph labeled V plots the AC input excitation voltage, which is depicted as a sinusoidal waveform. The plot labeled Iin=I1 shows an exemplary current waveform for the input current, which in this circuit, is the same as the current through LEDs1. A plot labeled 12 represents a current through the LED s2.

During a typical half-cycle, LEDs1 do not conduct until the AC input excitation voltage substantially overcomes the effective forward turn on for the diodes in the circuit. When the phase reaches A in the cycle, current starts to flow through the LEDs1 and the bypass switch. Input current increase until the bypass circuit begins to turn off the MOSFET at B. In some examples, the MOSFET may behave in a linear region (e.g., unsaturated, not rapidly switching between binary states) as the current divides between the MOSFET channel and the LEDs2. The MOSFET current may fall to zero as the current I2 through LEDs2 approaches the input current. At the peak input voltage excitation, the peak light output is reached. These steps occur in reverse after the AC input excitation voltage passes its peak and starts to fall.

FIG. 6B depicts an illustrative plot of exemplary relationships between luminance of the LEDs1 and LEDs2 in response to phase control (e.g., dimming). The relative behavior of output luminance of each of LEDs1 and LEDs2 will be reviewed for progressively increasing phase cutting, which corresponds to dimming.

At the origin and up to conduction angle A, phase control does not attenuate any current flow through LEDs1 or LEDs2. Accordingly, the LEDs1 maintains its peak luminance L1, and the LEDs2 maintains its peak luminance L2.

When the phase control delays conduction for angles between A and B, an average luminance of LEDs1 is decreased, but the phase control does not impact the current profile through LEDs2, so LEDs2 maintains luminance L2.

When the phase control delays conduction for angles between B and C, an average luminance of LEDs1 continues to fall as the increase in phase cutting continues to shorten the average illumination time of the LEDs1. The phase control also begins to shorten the average conduction time of the LEDs2, so L2 luminance falls toward zero as the phase control turn-on delay approaches C.

When the phase control delays conduction for angles between C and D, the phase controller completely blocks current during the time the excitation input level is above the threshold required to turn off the bypass switch. As a consequence, LEDs2 never carries current and thus outputs no light. LEDs1 output continues to fall toward zero at D.

At phase cutting beyond D, the light engine puts out substantially no light because the excitation voltage levels supplied by the phase controller are not sufficient to overcome the effective forward turn on voltage of the LEDs1.

FIG. 6C depicts an exemplary composite color temperature characteristic under phase control for the LED light engine of FIG. 6A. In this example, LEDs1 and LEDs2 that have different colors, T1 and T2, respectively. The luminance behavior of LEDs1 and LEDs2 as described with reference to FIG. 6B indicates that an exemplary light engine can shift its output color as it is dimmed. In an illustrative example, the color temperature may shift from a cool white toward a warmer red or green as the intensity is dimmed by a simple exemplary phase control. Examples of color temperature are further described with reference to at least FIG. 2, for example, of U.S. application Ser. No. 12/914,575, the entire contents of which are incorporated herein by reference.

At the origin and up to conduction angle A, phase control does not attenuate the illuminance of LEDs1 or LEDs2. Accordingly, the light engine may output a composite color temperature that is a mix of the component color temperatures according to their relative intensities.

When the phase control delays conduction for angles between A and B, an average color temperature increases as the luminance of the low color temperature LEDs1 is decreased (see FIG. 6B).

When the phase control delays conduction for angles between B and C, the color temperature falls relatively rapidly as the increased phase cutting attenuates the higher color temperature toward zero. In this range, the lower color temperature LEDs1 falls relatively slowly, but not to zero.

When the phase control delays conduction for angles between C and D, the only contributing color temperature is T1, so the color temperature remains constant as the luminance of LEDs1 falls toward zero at D.

The example of FIG. 6C may cover embodiments in which the different color LEDs are spatially oriented and located to yield a composite color output. By way of an example, multiple colors of LEDs may be arranged to form a beam in which the illumination from each LED color substantially shares a common orientation and direction with other colors.

In some other embodiments, different color LEDs may be behave substantially as described in FIGS. 6A and 6B, yet may be spatially oriented so that their output illumination does not form a composite color that responds according to FIG. 6C. As an illustration, an exemplary light fixture may include LEDs1 and LEDs 2 that are spatially oriented to direct their illumination in orthogonal directions. By way of example and not limitation, one color of LEDs may be oriented downward from a ceiling toward the floor, and another color of LEDs may be oriented radially in a plane parallel to the floor. Accordingly, an exemplary shift in light engine color output may appear to have a spatial component.

In light of the foregoing, it may be seen that composite color temperature may be manipulated by controlling current flow through or diverting away from groups of LEDs. In various examples, manipulation of current flow through groups of LEDs may be automatically performed by one or more bypass circuits that are configured to be responsive to AC excitation levels. Moreover, various embodiments have been described that selectively divert current to improve power factor and/or reduce harmonic distortion, for example, for a given peak output illumination level. Bypass circuits have been described herein that may be advantageously implemented with existing LED modules or integrated into an LED module to form an LED light engine with only a small number of components, with low power, and low overall cost.

Accordingly, it may be appreciated from the disclosure herein that color temperature shifting may be implemented or designed based on appropriate selection of LED groups. The selection of the number of diodes in each group, excitation voltage, phase control range, diode colors, and peak intensity parameters may be manipulated to yield improved electrical and/or light output performance for a range of lighting applications.

Although various embodiments have been described with reference to the figures, other embodiments are possible. For example, some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor, digital signal processor (DSP)), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

In some embodiments, implementations may be integrated with other elements, such as packaging and/or thermal management hardware. Examples of thermal other elements that may be advantageously integrated with the embodiments described herein are described with reference, for example, to FIG. 15 in U.S. Publ. Application 2009/0185373 A1, filed by Z. Grajcar on Nov. 19, 2008, the entire contents of which are incorporated herein by reference.

In various embodiments, apparatus and methods may include dynamically varying an impedance in a bypass path, which may advantageously improve power factor and reduce total harmonic distortion without introducing substantial resistive dissipation in series with the LED string (e.g., near peak current amplitude).

Although some embodiments may advantageously smoothly transition the light fixture output color from a cool color to a warm color as the AC excitation supplied to the light engine is reduced, other implementations are possible. For example, reducing AC input excitation may shift color temperature of an LED fixture from a relatively warm color to a relatively cool color, for example.

In accordance with another embodiment, AC input to the rectifier may be modified by other power processing circuitry. For example, a dimmer module that uses phase-control to delay turn on and/or interrupt current flow at selected points in each half cycle may be used. In some cases, harmonic improvement may still advantageously be achieved even when current is distorted by the dimmer module. Improved power factor may also be achieved where the rectified sinusoidal voltage waveform is amplitude modulated by a dimmer module, variable transformer, or rheostat, for example.

In one example, the excitation voltage may have a substantially sinusoidal waveform, such as line voltage at about 120 VAC at 50 or 60 Hz. In some examples, the excitation voltage may be a substantially sinusoidal waveform that has been processed by a dimming circuit, such as a phase-controlled switch that operates to delay turn on or to interrupt turn off at a selected phase in each half cycle. In some examples, the dimmer may modulate the amplitude of the AC sinusoidal voltage (e.g., AC-to-AC converter), or modulate an amplitude of the rectified sinusoidal waveform (e.g., DC-to-DC converter).

In some implementations, a computer program product may contain instructions that, when executed by a processor, cause the processor to adjust the color temperature and/or intensity of lighting, which may include LED lighting. Color temperature may be manipulated by a composite light apparatus that combines one or more LEDs of one or more color temperatures with one or more non-LED light sources, each having a unique color temperature and/or light output characteristic. By way of example and not limitation, multiple color temperature LEDs may be combined with one or more fluorescent, incandescent, halogen, and/or mercury lights sources to provide a desired color temperature characteristic over a range of excitation conditions.

In some embodiments, materials selection and processing may be controlled to manipulate the LED color temperature and other light output parameters (e.g., intensity, direction) so as to provide LEDs that will produce a desired composite characteristic. Appropriate selection of LEDs to provide a desired color temperature, in combination with appropriate application and threshold determination for the bypass circuit, can advantageously permit tailoring of color temperature variation over a range of input excitation.

In an illustrative embodiment, a rectifier may receive an AC (e.g., sinusoidal) voltage and deliver substantially unidirectional current to LED modules arranged in series. An effective turn-on voltage of the LED load may be reduced by diverting current around at least one of the diodes in the string while the AC input voltage is below a predetermined level. In various examples, selective current diversion within the LED string may extend the input current conduction angle and thereby substantially reduce harmonic distortion for AC LED lighting systems.

Various embodiments may provide reduced perceptible flicker to humans or animals by operating the LEDs to carry unidirectional current at twice the AC input excitation frequency. For example, a full-wave rectifier may supply 100 or 120 Hz load current (rectified sine wave), respectively, in response to 50 or 60 Hz sinusoidal input voltage excitation. The increased load frequency produces a corresponding increase in the flicker frequency of the illumination, which tends to push the flicker energy toward or beyond the level at which it can be perceived by humans or some animals (e.g., above a critical fusion frequency). This may advantageously reduce stress related to flickering light.

In some embodiments, implementations may be integrated with other elements, such as packaging and/or thermal management hardware. Examples of other thermal elements that may be advantageously integrated with the embodiments described herein are described with reference, for example, to FIG. 15 in U.S. Publ. Application 2009/0185373 A1, filed by Z. Grajcar on Nov. 19, 2008, the entire contents of which are incorporated herein by reference.

In accordance with another embodiment, additional components may be included, for example, to reduce reverse leakage current through the diodes. For example, a low reverse leakage rectifier that is not an LED may be included in series with both branches of the rectifier to minimize reverse leakage in the positive and negative current paths in the rectifier.

In some implementations, the amplitude of the excitation voltage may be modulated, for example, by controlled switching of transformer taps. In general, some combinations of taps may be associated with a number of different turns ratios. For example, solid state or mechanical relays may be used to select from among a number of available taps on the primary and/or secondary of a transformer so as to provide a turns ratio nearest to a desired AC excitation voltage.

In some examples, AC excitation amplitude may be dynamically adjusted by a variable transformer (e.g., variac) that can provide a smooth continuous adjustment of AC excitation voltage over an operating range. In some embodiments, AC excitation may be generated by a variable speed/voltage electro-mechanical generator (e.g., diesel powered). A generator may be operated with controlled speed and/or current parameters to supply a desired AC excitation to an LED-based light engine, such as the light engine 105 of FIG.

1, for example. In some implementations, AC excitation to the light engine may be provided using well-known solid state and/or electro-mechanical methods that may combine AC-DC rectification, DC-DC conversion (e.g., buck-boost, boost, buck, flyback), DC-AC inversion (e.g., half- or full-bridge, transformer coupled), and/or direct AC-AC conversion. Solid state switching techniques may use, for example, resonant (e.g., quasi-resonant, resonant), zero-cross (e.g., zero-current, zero-voltage) switching techniques, alone or in combination with appropriate modulation strategies (e.g., pulse density, pulse width, pulse-skipping, demand, or the like).

Certain implementations may be arranged to illuminate livestock during selected portions of the livestock lifecycle. In some applications, embodiments may provide artificially illuminate avian fowl, for example, during several developmental stages. In an illustrative example, a system may include AC LED light assemblies to provide substantially uniform illumination at chicken-eye level. The intensity of the illumination may be initialized to a high level for newborn chicks to promote, for example, myofiber growth, organ (e.g., eye pigment) development, and reduce risk of not finding food. For example, red light wavelengths may be important for some newborns to quickly find their food supply. An exemplary light program may provide relatively high excitation levels (e.g., little or no dimming) or about 100% of rated light intensity for a light engine. As the chicks develop and mature, a light program may include lower peak intensities (e.g., partial dimming). Some programs may take advantage of the natural dimming capabilities of LED light engines and simulate slowly increasing light (e.g., sun rising) and slowly decreasing light intensity (e.g., sunset) on a selected wake/sleep program schedule. As the subject animals mature, the peak intensity (e.g., noon) level of illumination may be gradually reduced to follow a desired program by controlling the excitation level via a single control parameter (e.g., maximum phase cut angle). In accordance with various examples described herein, one or more selected wavelengths may be substantially reduced or removed from the spectral output by merely reducing the excitation level below a threshold.

Some embodiments may only output selected wavelengths in response to the excitation level (e.g., phase-cutting, amplitude modulation) exceeding a threshold level associated with current conduction in a second set of LEDs (e.g., LEDs that are bypassed at an excitation level below the threshold). Accordingly, spectral output may be controlled by a single analog variable over a continuous range of applied AC excitation level, which is already applied to directly drive the LEDs (e.g., without auxiliary logical elements).

In an illustrative example, an egg-layer facility may promote sexual activity by modulating an electrical excitation level (e.g., dimming level) to provide a dose of red light, for example. In an embodiment, reducing a dimming control input signal may produce increasing luminous intensity as a function of excitation level (e.g., less dimming). In a light engine configured to provide a substantial (e.g., above a negligible threshold) amount of red and/or infrared flux substantially only at excitation levels above a threshold, peak excitation amplitude may be increased above the threshold to activate a group of LEDs that are bypassed at lower amplitude. More generally, a light engine configured with an LED that produces a selected wavelength in the bypass LED path may allow controllable spectral response with respect to that selected wavelength as a function of applied AC voltage. In various embodiments, the selected wavelength may be produced by wavelength selection, for example, using phosphors and/or nanocrystals as wavelength selective processes. Examples of suitable sources for achieving selected wavelengths for use in either the bypass or run paths, as described herein, are described in further detail with reference to at least FIGS. 7-10 of U.S. Provisional Patent Application entitled "Light Sources Adapted to Spectral Sensitivity of Diurnal Avians" Ser. No. 61/314,617, which was filed by Z. Grajcar on Mar. 17, 2010, the entire contents of which are incorporated herein by reference.

In another example, a broiler facility may gradually reduce peak intensity as the fowl matures and requires less light for healthy development. At excitation levels transition to levels below a threshold (e.g., bypass LED path remains inactive), the spectral content may shift from a relatively white or broadband light to a light with substantially reduced or negligible red or infrared. Absent the red spectrum, the more mature fowl may advantageously exhibit less aggression and reduced mortality (e.g., due to fighting).

In another illustrative example, turkey farms may advantageously be able use a single lamp to provide white color illumination under high electrical excitation, but dim to a substantially monochromatic blue light for milking operations. By adjusting the electrical excitation level to dim the lights from, for example, a substantially white, and de-activate all but those LEDs needed to produce a substantially or primarily monochromatic blue light. It is believed that monochromatic blue spectrum may tend to dramatically calm the turkeys so that they can be quickly, safely, and easily milked.

This document discloses technology relating to architecture for high power factor and low harmonic distortion of LED lighting systems. Related examples may be found in previously-filed disclosures that have common inventorship with this disclosure.

Examples of technology for dimming and color-shifting LEDs with AC excitation are described with reference, for example, to the various figures of U.S. Provisional Patent Application entitled "Color Temperature Shift Control for Dimmable AC LED Lighting," Ser. No. 61/234,094, which was filed by Z. Grajcar on Aug. 14, 2009, and to U.S. patent application entitled "Spectral Shift Control for Dimmable AC LED Lighting," Ser. No. 12/824,215, which was filed by Z. Grajcar on Jun. 27, 2010, the entire contents of each of which are incorporated herein by reference.

Examples of technology for improved power factor and reduced harmonic distortion for color-shifting LED lighting under AC excitation are described with reference, for example, to FIGS. 20A-20C of U.S. Provisional Patent Application entitled "Reduction of Harmonic Distortion for LED Loads," Ser. No. 61/233,829, which was filed by Z. Grajcar on Aug. 14, 2009, the entire contents of which are incorporated herein by reference.

Further embodiments of LED light engines are described with reference, for example, at least to FIGS. 1, 2, 5A-5B, 7A-7B, and 10A-10B of U.S. Provisional Patent Application entitled "Architecture for High Power Factor and Low Harmonic Distortion LED Lighting," Ser. No. 61/255,491, which was filed by Z. Grajcar on Oct. 28, 2009, and to at least the various schematics figures, for example, of U.S. patent application of the same title, with Ser. No. 12/914,575, which was filed by Z. Grajcar on Oct. 28, 20010, the entire contents of each of which are incorporated herein by reference.

Examples of a LED lamp assembly are described with reference, for example, to the various figures of U.S. Design patent application entitled "LED Downlight Assembly," Ser.

No. 29/345,833, which was filed by Z. Grajcar on Oct. 22, 2009, the entire contents of which are incorporated herein by reference.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A method of artificially illuminating swine during a life cycle to promote growth of the swine, the method comprising:
   providing an electric lamp configured to illuminate a livestock area in which swine develop;
   illuminating the livestock area with illuminants within the lamp, wherein the illuminants generate a selected wavelength;
   illuminating the livestock area with other illuminants within the lamp; and
   illuminating swine with the selected wavelength during selected portions of the swine lifecycle; and
   simulating a sunrise by increasing light intensity on the swine with a program on a selected program schedule to promote growth of the swine.

2. The method of claim 1, wherein the selected wavelength comprises a red color.

3. The method of claim 1, wherein the selected wavelength comprises an infrared color.

4. The method of claim 1, wherein the selected wavelength comprises a blue color.

5. The method of claim 1, further comprising the step of reducing a peak intensity level of illumination once the swine in the livestock area have reached a predetermined maturity level.

6. The method of claim 1, further comprising selectively discontinuing illuminating the swine with the selected wavelength and illuminating the livestock area with the other illuminants that output a white color.

* * * * *